(12) United States Patent
Aiyagari et al.

(10) Patent No.: US 6,195,385 B1
(45) Date of Patent: Feb. 27, 2001

(54) HTU-C CLOCKING FROM A SINGLE SOURCE

(75) Inventors: Sanjay K. Aiyagari, Santa Clara; Mick Henniger, Sunnyvale, both of CA (US)

(73) Assignee: Cisco Systems, Inc., San Jose, CA (US)

( * ) Notice: Subject to any disclaimer, the term of this patent is extended or adjusted under 35 U.S.C. 154(b) by 0 days.

(21) Appl. No.: 09/109,991

(22) Filed: Jun. 30, 1998

(51) Int. Cl.$^7$ ................................. H04B 1/38; H04L 5/16

(52) U.S. Cl. ............................................................ 375/222

(58) Field of Search ...................................... 375/222, 242, 375/253, 295, 306; 332/106–116; 370/480, 352, 351

(56) References Cited

U.S. PATENT DOCUMENTS 5,809,033 * 9/1998 Turner et al. ........................ 370/522
5,909,455 * 6/1999 Schneider ............................. 370/468
6,088,368 * 7/2000 Rubinstain et al. .................. 370/480

OTHER PUBLICATIONS

Advance Information of Bt8970, Single–Chip HDSL Transceiver; Brooktree Division of Rockwell Semiconductor Systems, Inc.; Dec. 1996.
Advance Information of Bt8953A, HDSL Channel Unit; Brooktree Corporation; Dec. 1996.
Transmission and Multiplexing (TM); High Bit Rate Digital Subscriber Line (HDSL) Transmission System on Metallic Local Lines; HDSL Core Specification and Applications for 2 048 kbit/s Based Access Digital Sections, European Telecommunications Standards Institute; ETR 152, Dec. 1996.

* cited by examiner

Primary Examiner—Stephen Chin
Assistant Examiner—Lenny Jiang
(74) Attorney, Agent, or Firm—Beyer Weaver & Thomas, LLP (57) ABSTRACT

An apparatus and method are provided for generating a plurality of data frames in a DSL modem configured as an HTU-C device using a single clock source. The technique of the present invention generates a data clock signal by combining a first clock signal provided by a clock source and a receiver overhead signal provided by framing circuitry for indicating the insertion of frame overhead bits into a data frame. The generated data clock signal has the characteristics such that, while said receiver overhead signal is inactive, said data clock signal is active at a frequency substantially equal to frequency of the first clock signal, and while the receiver overhead signal is active, the data clock signal is inactive. The result of this technique is that incoming data is clocked into the data frame at a data rate substantially equal to the frequency of the first clock signal only during time intervals when frame overhead bits are not being inserted into the one data frame. By using a single clock source to provide both the data rate and signaling rate, a reduction in cost, space, complexity, and power consumption of the HTU-C device may be achieved as compared to conventional devices.

72 Claims, 7 Drawing Sheets

HTU-C CLOCKING FROM A SINGLE SOURCE

CROSS-REFERENCE TO RELATED APPLICATIONS

The present application is related to commonly assigned, co-pending U.S. patent applications Ser. No. 09/107,230 for METHOD AND APPARATUS FOR TRANSMITTING DATA IN A PUBLIC NETWORK (Aiyagari, et. al.) filed on Jun. 30, 1998, and commonly assigned, co-pending U.S. patent application Ser. No. 09/107,840 for METHOD AND APPARATUS FOR TRANSMITTING DATA IN A PUBLIC NETWORK (Sharper, et. al.) filed on Jun. 30, 1998, the entire specifications of which are incorporated herein by reference.

BACKGROUND OF THE INVENTION

The present invention relates to transmission of data on a subscriber loop in a public network such as, for example, a telephone network. More specifically, the present invention provides an improvement of standard single pair digital subscriber line (SDSL) technology.

A wide variety of technologies and transmission standards have been developed for transmission of data via currently existing public network resources. A substantial portion of these resources comprise copper twisted pair transmission lines. This is especially true for the final connections to individual subscribers, i.e., subscriber loops. Without other limitations such as core network filters, such copper lines can achieve practical data rates on the order of tens of megabits per second (Mbps). Of course, substantial attenuation occurs at the higher data rates thereby limiting the length of the subscriber loop which may be serviced at such rates. For example, 24 gauge copper supports reliable transmission of data at the DS1 standard, i.e., 1.544 kbps, also commonly referred to as T1, for up to 12,000 feet. By contrast, the same 24 gauge copper will only support the STS-1 standard, i.e., 51.840 Mbps, for lines of less than 1000 feet.

The term "digital subscriber line" (DSL) refers to a modem or modem pair connected by one or more twisted pairs having a specific data frame format and associated transmission rate. The first digital subscriber line technology, referred to as IDSL, corresponds to what is also known as basic rate ISDN. IDSL technology transmits duplex data at 144 kbps over copper lines using a 2B1Q modulation scheme. The modems multiplex and demultiplex the data stream into two B channels (64 kbps each) and a D channel (16 kbps) as described in ANSI T1.601, the entirety of which is incorporated herein by reference for all purposes.

Figure 1:
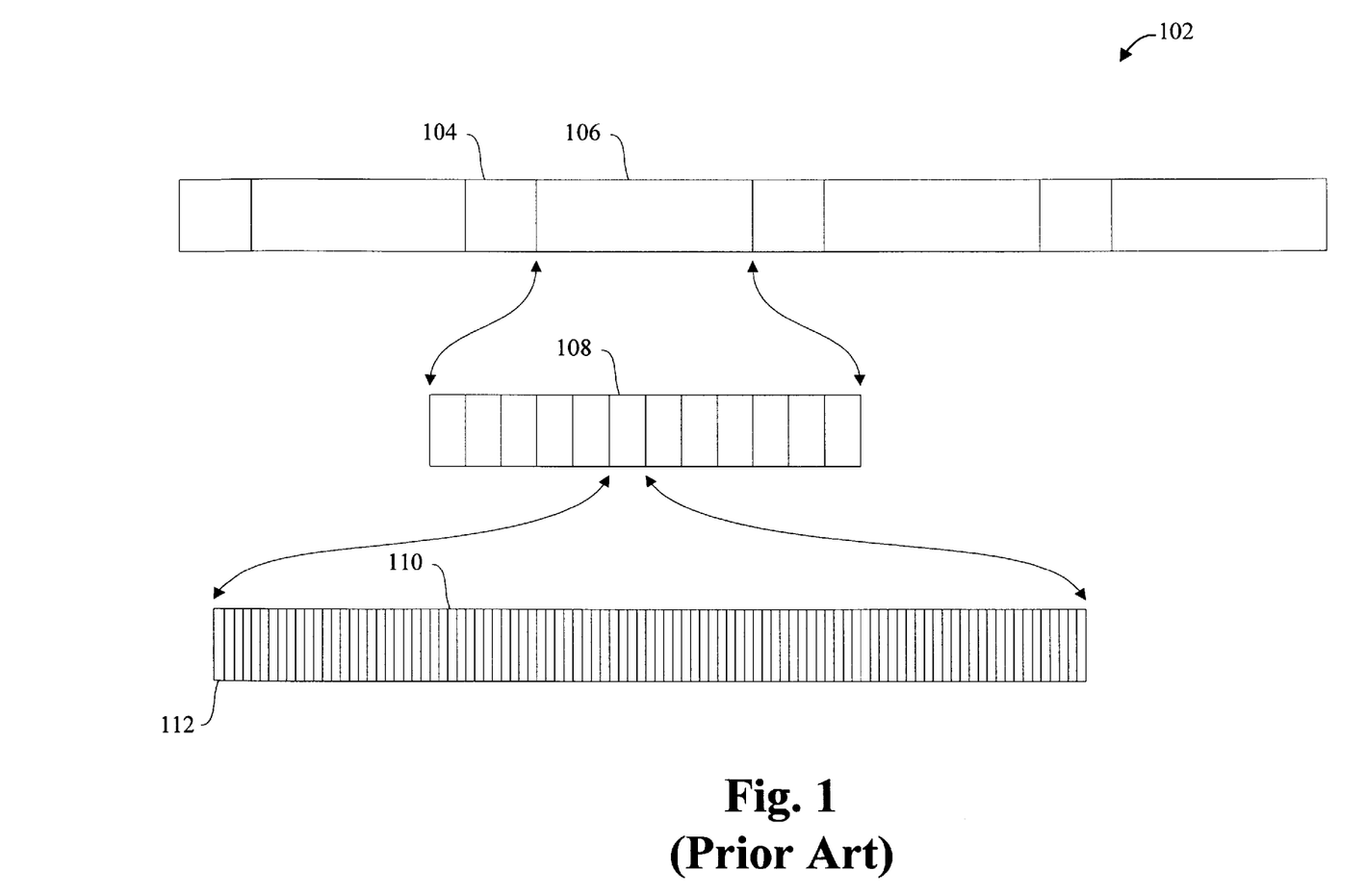
FIG. 1 is a simplified block diagram of a standard HDSL frame format.

High data rate digital subscriber lines (HDSL) are related to the earlier IDSL using the same modulation scheme to transmit data at the T1 data rate over two twisted pairs as described in ANSI Committee T1 TR-28, the entirety of which is incorporated herein by reference for all purposes. A single pair digital subscriber line (SDSL) is a single pair version of HDSL, i.e., transmitting data at one-half the T1 data rate, i.e., 768 kbps, over a single twisted pair. For both HDSL and SDSL and as shown in FIG. 1, data are organized into 6 ms frames 102 comprising alternating overhead and payload sections 104 and 106. The four payload sections 106 each include twelve 97-bit payload blocks 108, 96 bits (110) of which are data and one bit (112) of which represents block overhead. This works out to the well known data rate of 768 kbps. Overhead sections 104 and 112 represent an additional 16 kbps for an actual transmission rate of 784 kbps.

Figure 2:
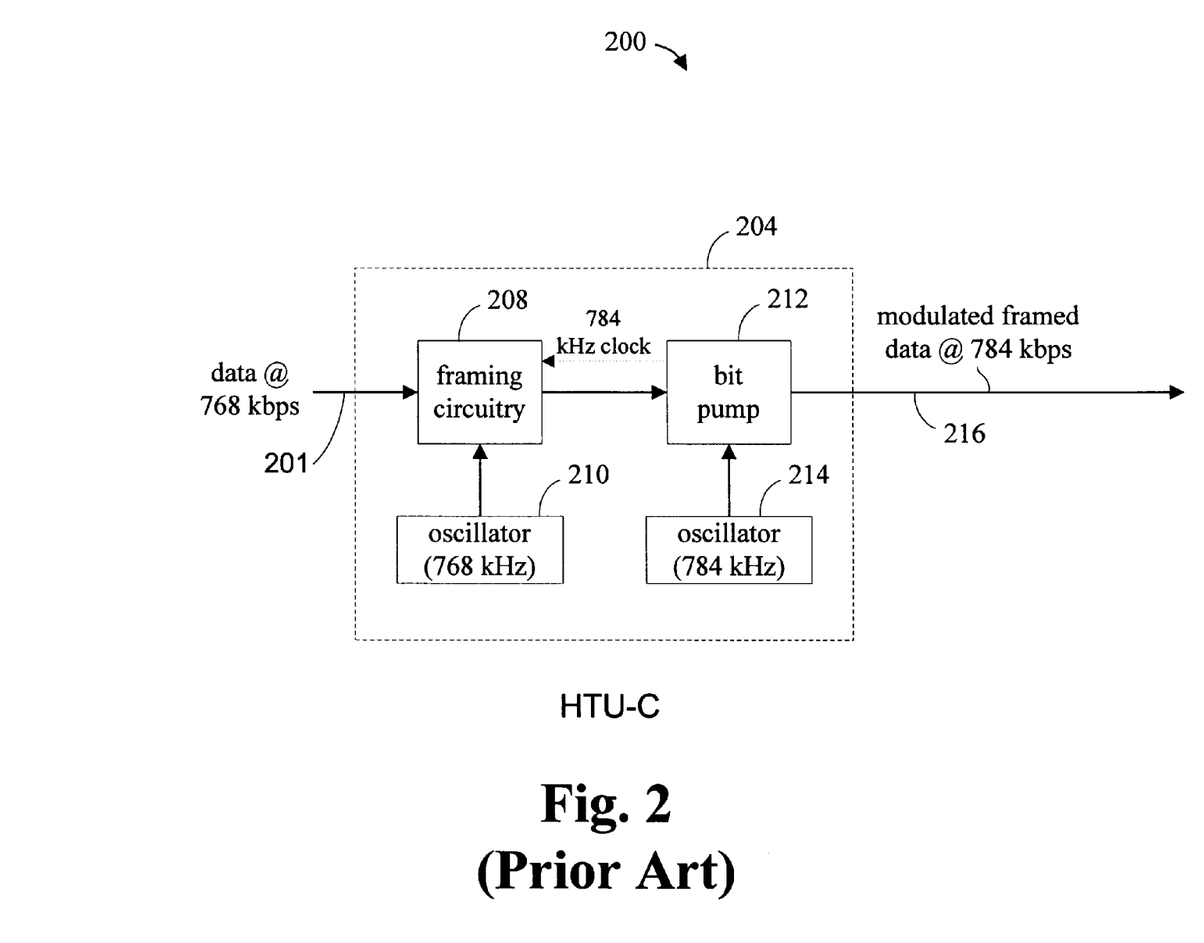
FIG. 2 is a simplified block diagram of an HDSL terminal unit configured as a central office or public branch exchange.

FIG. 2 is a simplified block diagram of one portion 200 of a standard SDSL, configured as a HDSL Terminal Unit-Central Office (HTU-C) or public branch exchange (represented by modem 204). The central office typically transmits data via twisted pair line 216 to a subscriber premises (represented by modem 206, FIG. 3). The data to be transmitted enters framing circuitry 208 of modem 204 at the raw data rate of, for example, 768 kbps. Framing circuitry 208 organizes the incoming data stream into the 6 ms frames described above with reference to FIG. 1. In order to perform this task, the framing circuitry 208 utilizes a signal generated from a 768 kHz oscillator 210. The signal provided by oscillator 210 to framing circuitry 208 functions as a data clock, and is used in communicating and synchronizing with incoming raw data on line 201. While the framing circuitry 208 organizes the incoming data stream into the 6 ms frames, it generates frame overhead data, which is multiplexed with the raw data, and inserted into the frame at a rate of 16 kbps. During the time that the frame overhead data is being inserted into the frame, the incoming raw data is queued in a FIFO buffer. When the insertion of frame overhead data is finished, the data from the FIFO buffer is then inserted into the frame, followed by incoming raw data from line 201. The framed data are then sent to bit pump 212 where, using a 784 kHz oscillator 214, they are encoded according to the 2B1Q modulation scheme and transmitted via twisted pair line 216 to the subscriber premises.

As shown in FIG. 2, a conventional HTU-C system, requires two different clock sources: one for the data rate and one for the signaling rate. The solution to this requirement is classically solved via two externally provided clock signals, each signal being generated from a separate oscillator. In FIG. 2, the 768 kHz oscillator 210 is utilized as a data clock by the framing circuitry for generating the data frames and for communicating and synchronizing with the incoming raw data. The 784 kHz oscillator 214 is utilized as a signaling clock by the bit pump for modulating the data frames according to the 2B1Q modulation scheme. However, use of two separate clock sources increases cost, complexity, power consumption, and space utilization of the DSL modem. What is desirable, therefore, is to provide a DSL modem having reduced, cost, complexity, power consumption, and space requirements compared to conventional DSL modems configured as HTU-C devices.

SUMMARY OF THE INVENTION

This and additional objects are accomplished by the various aspects of the present invention wherein, briefly, according to a principal aspect, a digital subscriber line (DSL) modem is provided wherein the clocking signals utilized by the framing circuitry and bit pump are both derived from a single external clock source.

Accordingly, a first aspect of the present invention is directed to a DSL modem for receiving an incoming data stream and generating a sequence of data frames for a digital subscriber line. The modem comprises a clock source for providing a first clock signal; a modulation circuit; and framing circuit which provides a receiver overhead signal for indicating the incorporation of frame overhead bits into generated data frames; and a clocking circuit adapted to receive the first clock signal and the receiver overhead signal for providing a second clock signal to the framing circuit. The clocking circuit includes logic means for combining the first clock signal and the receiver overhead signal to generate the second clock signal, wherein the generated second clock signal has a specific timing relationship to the first clock signal and the receiver overhead signal such that, while the receiver overhead signal is inactive, a second clock signal is active at a frequency substantially equal to the frequency of the first clock signal, and while the receiver overhead signal is active, a second clock signal is inactive. This generated second clock signal is utilized by the framing circuit for communication with the incoming data stream.

A second aspect of the present invention is directed to an apparatus included within a DSL modem. The DSL modem includes a modulation circuit; a clock source for providing a first clock signal; and a framing circuit which provides a receiver overhead signal for indicating the incorporation of frame overhead bits into each data frame. The framing circuit further includes a pulse code multiplexed (PCM) interface circuit for communication with incoming PCM data. The apparatus comprises a clocking circuit adapted to receive the first clock signal and the receiver overhead signal for providing a second clock signal to the framing circuit. The clocking circuit includes logic means for logically combining the first clock signal and the receiver overhead signal to generate the second clock signal, wherein the timing of the generated second clock signal is such that, while the receiver overhead signal is inactive, the second clock signal is active at a frequency substantially equal to the frequency of he first clock signal, and while the receiver overhead signal is active, the second clock frequency is inactive. This generated second clock signal is utilized by the framing circuit for communication with the PCM data.

A third aspect of the present invention is directed to a digital subscriber line apparatus for receiving an incoming data stream and generating a sequence of data frames for output to a digital subscriber line. The DSL apparatus comprises a clock source for providing one of a plurality of clock signals, wherein the one clock signal has an associated frequency of n Hz; a modulation circuit; a framing circuit which provides a receiver overhead signal for indicating the incorporation of frame overhead bits into each sequence of data frames, wherein the receiver overhead signal has an associated average frequency of m Hz; and a clocking circuit adapted to receive the one clock signal and the receiver overhead signal for providing a second clock signal to the framing circuit. The clocking circuit includes logic means for combining the one clock signal and the receiver overhead signal to generate a second clock signal such that while the receiver overhead signal is inactive, the second clock signal is active at a frequency substantially equal to n Hz, and while the receiver overhead signal is active, the second clock signal is inactive. The resulting second clock signal generated by the clocking circuit has an associated average frequency of (n-m) Hz. This second clock signal is utilized by the framing circuit in generating the sequence of data frames, wherein each of the sequence of generated data frames has an associated average frequency of (n-m) Hz.

A fourth aspect of the present invention is directed to a method for generating a second clock signal to be used by a framing circuit in a DSL modem configured as an HTU-C device. The method includes receiving a first clock signal from a first clock source; receiving a receiver overhead signal provided by the framing circuitry; combining the first clock signal with the receiver overhead signal to generate a second clock signal such that, while the receiver overhead signal is inactive, the second clock signal is active at a frequency substantially equal to the frequency of the first clock signal, and while the receiver overhead signal is active, the second clock signal is inactive; and providing the second clock signal to the framing circuit.

A fifth aspect of the present invention is directed to a method for providing a framing circuit with a data clock signal for use in generating a plurality of data frames, wherein the data clock signal is derived from a single clock source. The method includes receiving a first clock signal from a first clock source; receiving a receiver overhead signal from a framing circuit; providing an active data clock signal to the framing circuit while the receiver overhead signal is inactive, wherein the data clock signal has an associated frequency substantially equal to the frequency of the first clock signal; and providing an inactive data clock signal to the framing circuit while the receiver overhead signal is active.

A sixth aspect of the present invention is directed to a method for generating a plurality of data frames in a DSL modem configured as an HTU-C device using a single clock source. The method includes the steps of receiving a first clock signal from a single clock source; receiving a receiver overhead signal from framing circuitry within the DSL modem; and using the first clock signal and receiver overhead signal to clock data into one of the plurality of data frames at a data rate substantially equal to the frequency of the first clock signal only during time intervals when frame overhead bits are not being inserted into the one data frame.

In accordance with the aspects described above, the present invention provides numerous benefits when compared to conventional HTU-C devices which utilize two externally inserted clock signals for generating the data rate and signaling rate, respectively. First, the technique of the present invention for clocking both the data rate and signaling rate from a single external clocking source precludes the need for a separate oscillator or for a separate data clock source. The use of a single clock source or oscillator in the DSL modem of the present invention results in a reduction of space, cost, complexity, and power consumption over conventional DSL modems configured as HTU-C devices. Additionally, as described in greater detail below, the generated data clock signal of the present invention is only active during times when overhead bits are not being inserted in to the data frame by the framing circuitry. This means that incoming data bits are generally clocked into the framing circuit when the framing circuit is ready to receive the data bits, and not at times when the framing circuit is inserting frame overhead bits into the data frame. Consequently, the FIFO buffer within the framing circuitry may be reduced in size since fewer, if any, data bits are clocked into the framing circuitry while the framing circuitry is inserting frame overhead bits into the data frame.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIGS. 6A and B illustrate schematic diagrams of alternate embodiments of clock circuitry block 410 of FIG. 4.

DETAILED DESCRIPTION OF THE PREFERRED EMBODIMENT

Figure 3:
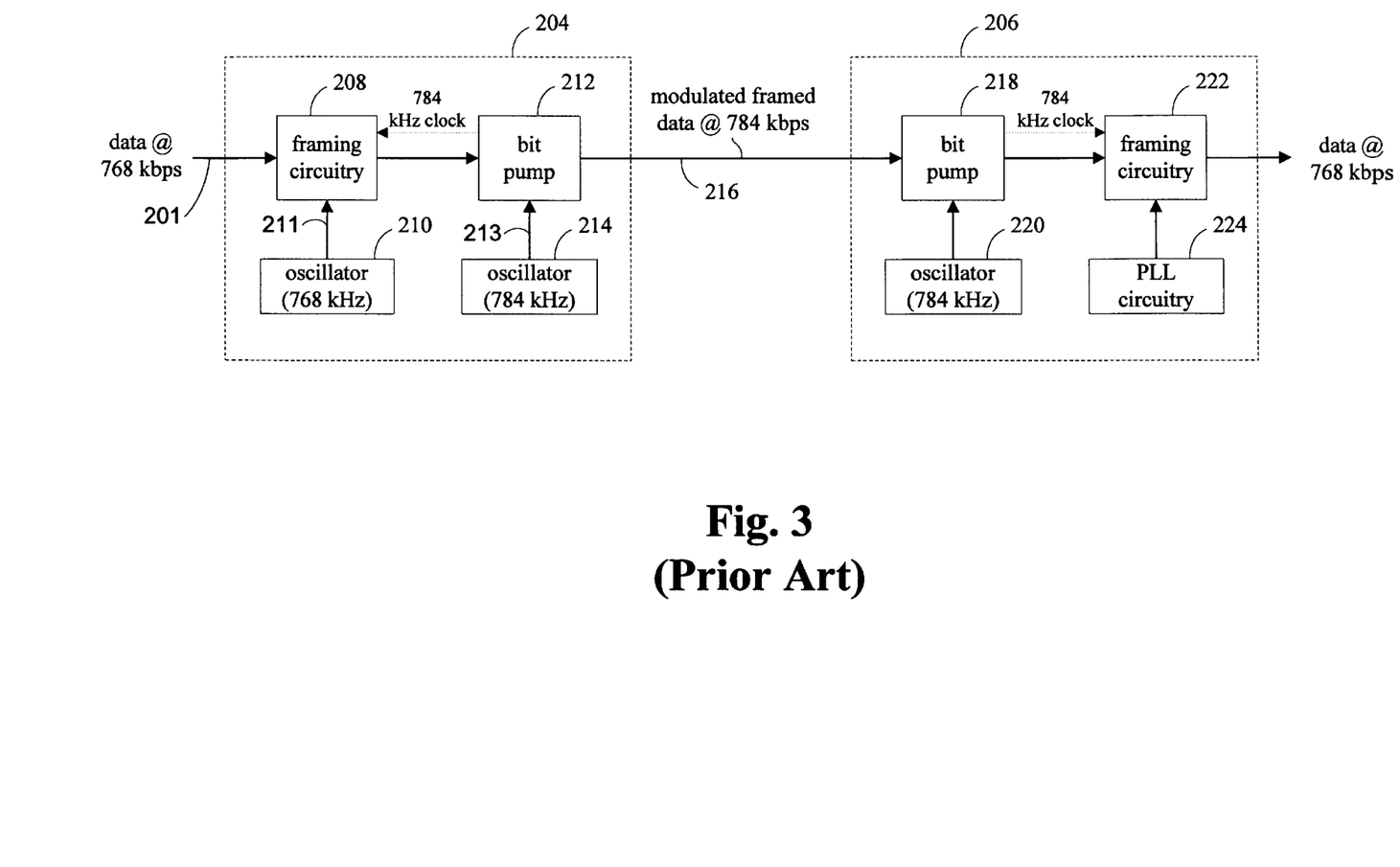
FIG. 3 is a simplified block diagram of a standard SDSL connecting a central office for public branch exchange and a subscriber premises.
Figure 4A:
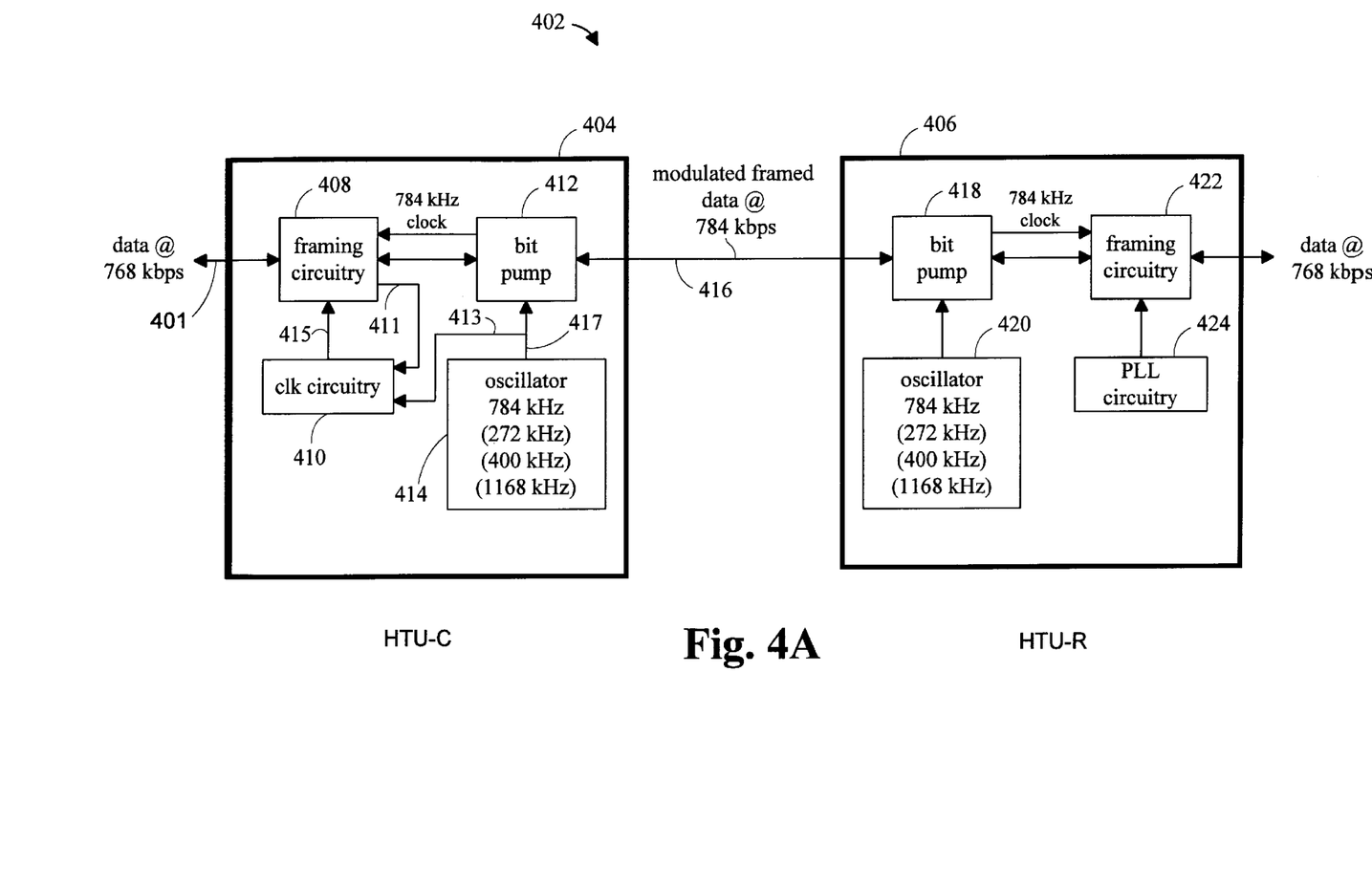
FIG. 4A is a simplified block diagram of an SDSL connecting a central office or public branch exchange and a subscriber premises according to a specific embodiment of the present invention.
Figure 4B:
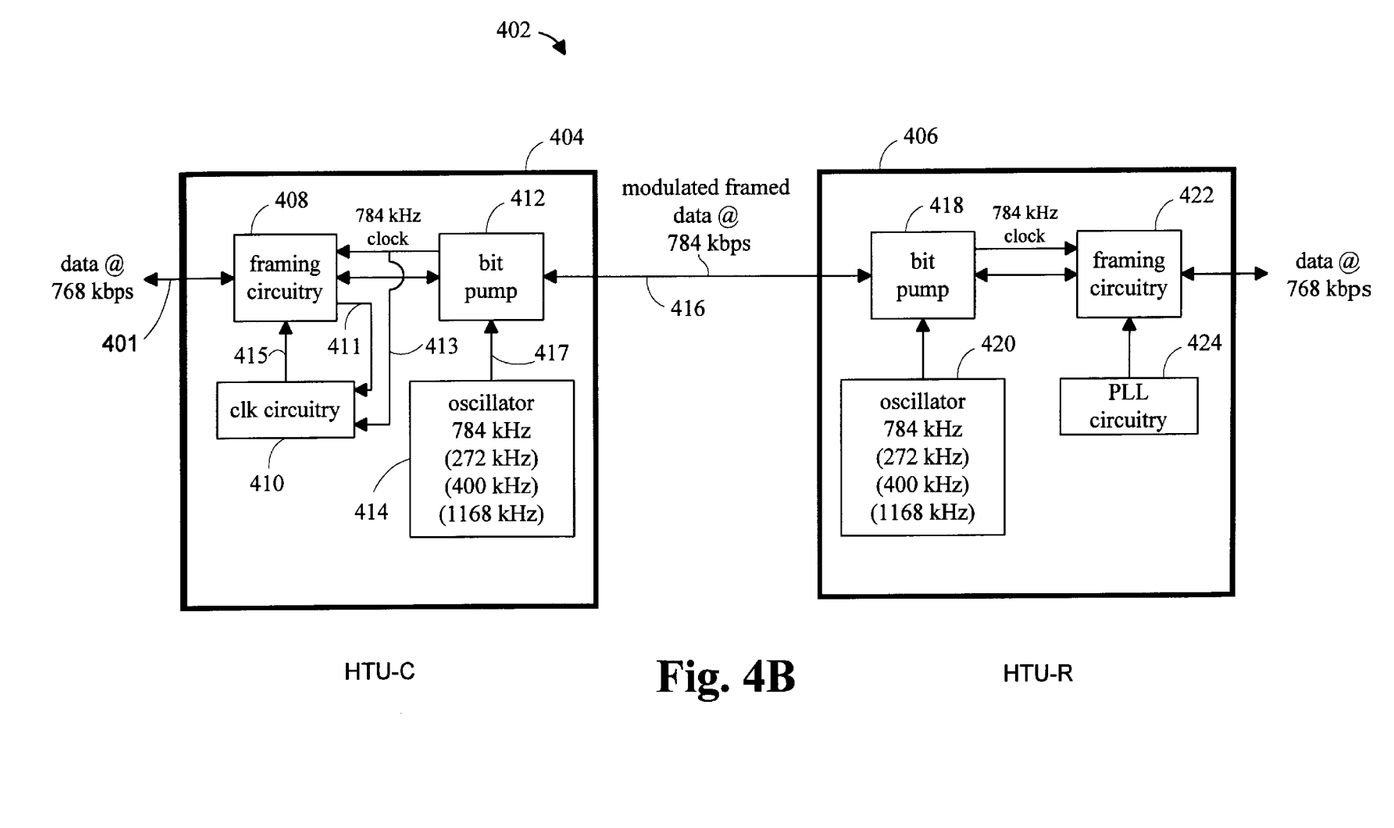
FIG. 4B is a simplified block diagram of an SDSL connection a central office or public branch exchange and a subscriber premises according to an alternate embodiment of the present invention.

FIG. 3 is a simplified block diagram of a standard SDSL 202 connecting a central office or public branch exchange (represented by modem 204) and a subscriber premises (represented by modem 206). Modem 204, representing the central office, may be commonly referred to as an HDSL Terminal Unit-Central Office (HTU-C) device. The data to be transmitted enters framing circuitry 208 of modem 204 on line 201 at the raw data rate of, for example, 768 kbps. The raw data on line 201 is typically in the form of pulse code multiplexed (PCM) data. Although not shown in the drawings, framing circuitry 208 (and 408, FIGS. 4A,B) includes a PCM interface circuit to handle communication and synchronization with the incoming PCM data. The signal provided by oscillator 210 to framing circuitry 208 functions as a data clock, and is used by the PCM interface circuit in communicating and synchronizing with incoming raw data on line 201.

According to HDSL standards, framing circuitry 208 organizes the incoming data stream into the 6 ms frames described above with reference to FIG. 1 using a 768 kHz oscillator 210 and 16 kbps of frame overhead data generated by framing circuitry 208. The framed data are then sent to bit pump 212 where, using a 784 kHz oscillator 214, they are encoded according to the 2B1Q modulation scheme and transmitted via twisted pair line 216 to the subscriber premises as represented by modem 206. Modem 206, representing the subscriber premises, may commonly be referred to as a HDSL Terminal Unit-Remote (HTU-R) device.

At the subscriber premises, the modulated framed data are received at the rate of 784 kbps and demodulated by bit pump 218 which is clocked by a 784 kHz oscillator 220. The demodulated data are then received by framing circuitry 222 which strips off the 16 kbps frame overhead data and decomposes the 6 ms HDSL frames into a 768 kbps data stream. Framing circuitry 222 is clocked by a phase-locked loop (PLL) recovered clock (PLL circuitry 224) derived from the incoming data stream. In this way, the clocks for framing circuitry 208 and 222 are coincident.

It is to be noted that some of the terms and circuitry described in this application are commonly known to one having skill in the relevant art. For this reason, and in order to avoid undue confusion, such circuitry and terms are not defined in detail in the present application. However, a complete description of the meaning and function of various terms and circuits described in this application may be found in the following reference, which is incorporated by reference in its entirety: "Transmission and Multiplexing; High bit rate Digital Subscriber Line (HDSL) transmission system on metallic local lines; HDSL core specification and applications for 2048 kbit/s based access digital sections," European Telecommunications Standards Institute (ETSI) Technical Report No. 152, ETSI, Valbonne, France, Third Edition, December 1996.

As discussed above, conventional HTU-C systems utilize two separate and independent clock sources, as shown in FIG. 3. Referring to FIG. 3 it can be seen that one clock source is provided by oscillator 214, generating a 784 kHz clock signal which is utilized by the bit pump 212 to derive its signaling rate. The other clock source is provided by oscillator 210, which provides a data clock signal 211 to the framing circuitry 208. However, the use of two oscillators within DSL modem 204 utilizes extra space, and increases cost, complexity and power consumption. The need for a separate clock sources is evident since one clock source is need to provide for the data rate, and the other clock source is needed to provide for the signaling rate. Since the signaling rate cannot be evenly divided to produce the data rate, the classic solution for solving the requirement of two separate clock sources in central office equipment has been to provide two externally inserted clock signals. Additionally, as the cost of electronic components has decreased, a simple solution of providing two oscillators has, until now provided an adequate solution to the requirement of two different clock sources in HTU-C devices.

However, the technique of the present invention provides an alternate solution to the requirement of different clock sources for a data rate and a signaling rate, wherein both clocking rates are derived from a single external source. As described above, and as will be apparent from the discussion below, the technique of the present invention reduces space, cost, complexity, and power consumption over classical solutions for configuring HTU-C devices FIG. 4A is a simplified block diagram of one embodiment of the present invention showing an SDSL 402 connecting a central office (HTU-C) or public branch exchange, represented by modem 404, and a subscriber premises (HTU-R), represented by modem 406. In this example, the data to be transmitted enters framing circuitry 408 on line 401 at the raw data rate of 768 kbps. It will be understood that data may enter the subscriber loop at a variety of rates without departing from the invention. Framing circuitry 408 may be based on chip sets from, for example, Brooktree Bt8953A HDSL Channel Unit (manufactured by Brooktree Corp., San Diego, Calif.) or the Level One SK70720 MDSL Framer chip. Using 16 kbps of frame overhead data, framing circuitry 408 organizes the incoming data stream into frames similar to those described above with reference to FIG. 1. The currently available chip sets use this programmability to be able to support both U.S. and European HDSL and SDSL data rates, e.g., 784, 1168, and 2320 kbps.

The framed data are then sent to bit pump 412 where, using clock circuitry 414, they are encoded according to the 2B1Q modulation scheme and transmitted via twisted pair line 416 to the subscriber premises as represented by modem 406. Modulation circuitry such as bit pump 412 may be based on a chip, for example, the Brooktree Bt8970 Single Chip HDSL Transceiver (manufactured by Brooktree Corp., San Diego, Calif.).

At the subscriber premises, the modulated framed data are received at the rate of 784 kbps and demodulated by bit pump 418 which is clocked by a 784 kHz oscillator 420. The demodulated data are then received by framing circuitry 422 which strips off the 16 kbps frame overhead data and decomposes the 6 ms HDSL frames into a 768 kbps data stream. Framing circuitry 422 is clocked by a phase-locked loop (PLL) recovered clock (PLL circuitry 424) derived from the incoming data stream. In this way, the clocks for framing circuitry 408 and 422 are coincident.

As shown in FIG. 4A, one of the primary differences which distinguish the DSL modem 404 of the present invention from conventional DSL modems (FIG. 2) is that a single oscillator 414 is used to drive both a signaling rate (derived from signal line 417) and the data rate (derived from signal line 415). In the examples depicted in FIGS. 4A, 4B, and FIG. 5, an oscillator having the frequency of 784 kHz is described. However, it is to be understood that any other type of clock circuitry may be provided which conforms to the standards and specifications required for implementing SDSL or HDSL technology. For example, oscillator 414 may provide other frequencies other 784 kHz such as, for example 272 kHz, 400 kHz, and 1168 kHz. Alternatively, although not shown, a multiplexed clock source may be provided which provides one of a plurality of differing clock frequencies. Or, in the alternative, a programmable frequency multiplier may be employed which provides one of a plurality of clock frequencies to be used by the DSL modem 404. However, as noted below, such an embodiment would need to overcome problems associated with oscillator uncertainty. Regardless of the clock source provided by clocking circuit 414, the clock signal provided by that clock source will be used to generate the data clock signal 415 for use by the framing circuitry 408 in generating the plurality of data frames. In this way, the HTU-C device 404 derives both its data rate and signal rate from a single clock source signal 417.

In the example shown in FIG. 4A, oscillator 414 provides a 784 kHz clock signal 417 to bit pump 412. This clock signal is also provided via signal line 413 to clock circuitry block 410. Although not depicted in the drawings, framing circuitry 408 includes an output pin which provides a receiver overhead signal. The receiver overhead signal essentially comprises a binary signal having two states, and active state and an inactive state. The condition of the active state and inactive is controlled internally within the frame in circuitry, and this signal is used to indicate the insertion of frame overhead bits into the generated data frame. Thus, while the receiver overhead signal is active, the framing circuitry is in the process of inserting frame overhead bits into the data frame. During this time raw data bits are not being inserted into the data frame, but rather are queued into a FIFO buffer within the framing circuitry (not shown). After the framing circuitry has finished inserting the frame overhead bits into the data frame, it sets the receiver overhead signal to inactive, and continues to insert data bits into the data frame, beginning with the bits that were first stored in the FIFO buffer.

Despite the fact that the framing circuit 408 provides the receiver overhead signal for indicating the insertion of frame overhead bits into the data frame, the use of such a signal has provided little, if any, practical applications. Since it is the job of the framing circuitry 408 to internally organize the incoming data and frame overhead bits into a data frame having a specific format, a knowledge of exactly when those frame overhead bits are being inserted into the data frame has, in the past, been deemed to be of little value. Additionally, since framing circuitry 408 coordinates the synchronization of incoming data and insertion of frame overhead bits internally, there was no practical use to be made of the receiver overhead signal.

Contrary to conventional practices, however, the technique of the present invention advantageously utilizes the receiver overhead signal in combination with clock signal 413 to produce a data clock signal 415 which is utilized by the framing circuitry to generate the plurality of data frames in the DSL modem 404. Moreover, both the data clock signal 415 and the bit pump (or signal) clock signal 417 are derived from a common clock source 414. A more detailed description of how the oscillator signal 413 and the receiver overhead signal 411 are utilized to provide a data signal 415 to the framing circuitry 408 is shown in FIG. 5.

Figure 5:
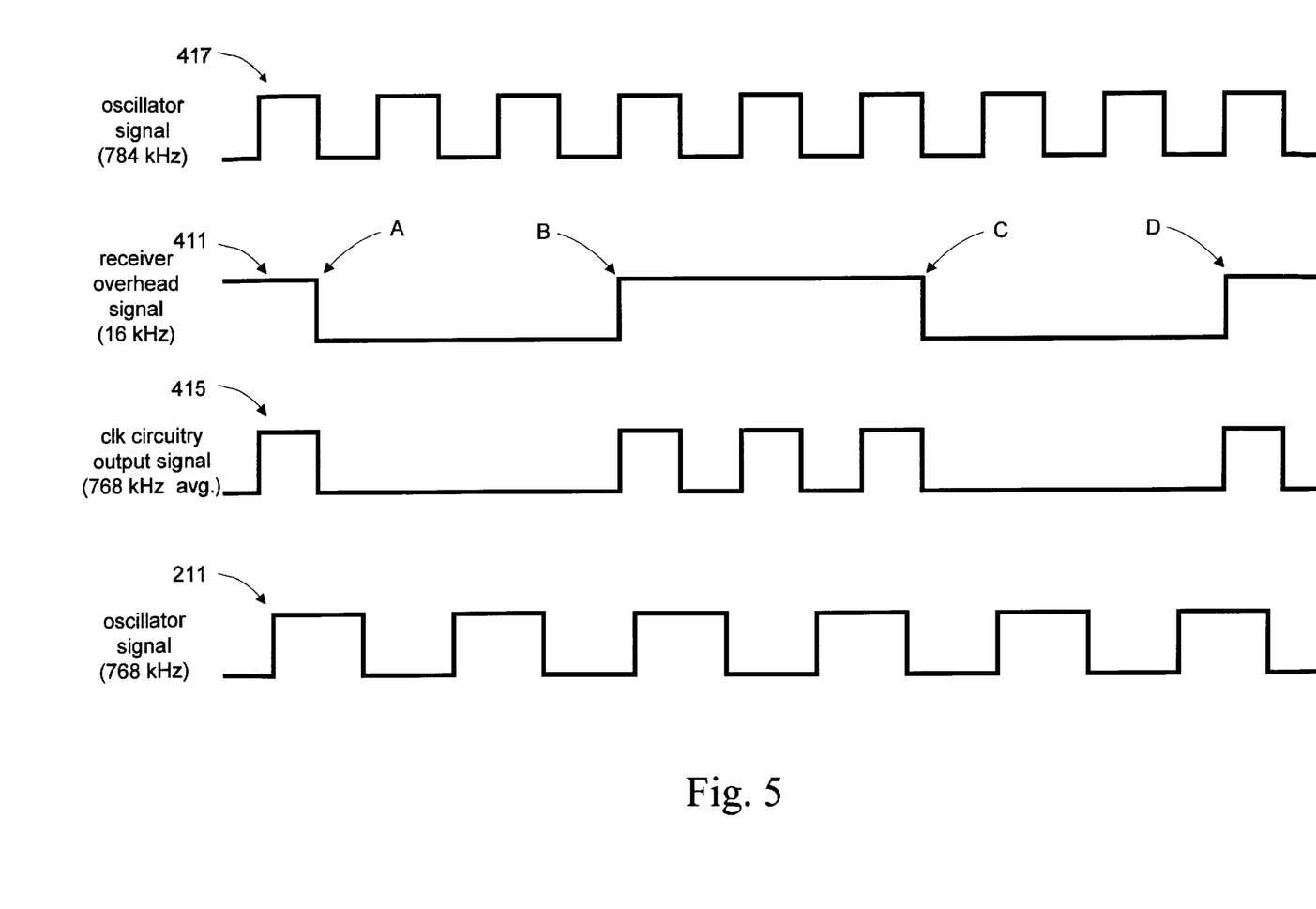
FIG. 5 illustrates timing diagrams of various signal lines identified in FIGS. 3, 4A, and B of the drawings.

FIG. 5 illustrates the timing diagrams of the various signal lines of FIGS. 2 and 4. It is to be noted that the timing diagrams shown in FIG. 5 are not drawn to scale, and are for purposes of illustration and discussion only. At the top of FIG. 5 is shown oscillator signal 417, providing a frequency of 784 kHz. Next is shown the timing diagram for receiver overhead signal 411, which has a frequency of 16 kHz. By logically combining signal 417 with signal 411, the resultant signal 415 may be produced, as described below.

As stated previously, receiver overhead signal 411 has an active state and an inactive state. It will be assumed for purposes of this illustration that the receiver overhead signal is configured to be active low, meaning that, while the receiver overhead signal is in a low state, the framing circuitry 408 is inserting frame overhead bits into the data frame; and while receiver overhead signal is high, the framing circuitry is not inserting frame overhead bits into the data frame. As shown in FIG. 5, clock circuitry output 415 is generated to have a specific timing relation ship to the oscillator signal 417 and the receiver overhead signal 411. This timing relationship is such that, while the receiver overhead signal is inactive (i.e. at its high value), the clock circuitry signal 415 is active at substantially the same frequency as oscillator signal 417; and while the receiver overhead signal is active (i.e. at its low value), the clock circuitry signal 415 is inactive. Thus, referring to FIG. 5, while the receiver overhead signal is in its inactive state, the clock circuitry output signal parallels oscillator signal 417. At point A, the receiver overhead signal goes active (active low), causing the clock circuitry output signal 415 to go inactive during the time portion while the receiver overhead signal is active. At point B, the receiver overhead signal goes inactive, at which point the clock circuitry output 415 signal goes active again at a frequency substantially equal to oscillator signal 417. At point C, the receiver overhead signal goes active, and the clock circuitry signal goes inactive, and remains inactive until point D when the receiver overhead signal goes inactive again.

Thus as shown in FIG. 5, the clock circuitry output signal 415 has two discrete frequencies. While the receiver overhead signal 411 is active (e.g. between points A and B), the clock circuitry output signal 415 has a frequency during this time interval of zero Hz. While the receiver overhead signal 411 is inactive (e.g. between points B and C), the clock circuitry output signal has a frequency during this time interval of 784 kHz. However, the time averaged value of the frequency of clock circuitry output signal 415 may be calculated by subtracting the frequency of the receiver overhead signal (16 kHz) from the oscillator signal (784 kHz), yielding an average frequency of 768 kHz. It is noted that the frequency of 768 kHz is the same frequency that is required by a framing circuitry 408 for generating data frames and for communicating and synchronizing with the incoming data on line 401 (FIG. 4A). In general terms, according to the technique of the present invention, if oscillator 414 produces a clock signal having an average frequency of n Hz, and the receiver overhead signal 411 has an average frequency of m Hz, then the resulting clock signal 415 from clock circuitry block 410 will have an average frequency of (n-m) Hz.

Referring back to FIG. 5 it can also be seen that clock circuitry output signal 415 is comprised of a plurality of temporarily non-uniform clock pulses. In other words, the clock pulses of clock circuitry output signal 415 are not distributed uniformly over time, as compared to oscillator signal 417 (which are uniformly distributed over time). Rather, as can be seen from the illustration, clock circuitry output signal 415 comprises a plurality of discrete groups of clock pulses. Conventional wisdom would argue that such a clock signal having temporarily non-uniform clock pulses would be undesirable for applications requiring a clock signal source. In contrast, experimental evidence has shown that technique of the present invention not only function as expected, but the non-uniformity of the clock pulses of clock circuitry output signal 415 provides the unexpected advantage of reducing the quantity of data bits which are queued in the FIFO buffer while the framing circuitry inserts frame overhead bits into the data frame. This, in turn, leads to another advantage in that, according to the technique of the present invention, the size of the FIFO buffer may be reduced.

In other words, by supplying framing circuitry with clock circuitry output signal 415, an advantage is realized in that incoming data is generally clocked into the framing circuitry at times when the circuitry is ready to receive and insert the data into the data frame, and not at times when, as with the conventional systems, the framing circuitry is inserting frame overhead bits into the data frame. Consequently, the size of the FIFO buffer used to store data bits while the framing circuitry is inserting frame overhead bits into the data frame may be reduced since a significantly fewer of data bits are clocked into the framing circuitry 408 at this time using clock circuitry output signal 415.

FIG. 4B is an alternative embodiment of the present invention showing a simplified block diagram of an SDSL 402 connecting an HTU-C device 404 to an HTU-R device 406. The primary difference between FIGS. 4A and 4B is that, in FIG. 4B, clock circuitry block 410 is adapted to receive the oscillator signal from line 413, which is connected to the clock signal line provided by the bit pump to the framing circuitry. Thus, in FIG. 4B, clock circuitry 410 acquires the 784 kHz signal from bit pump 412, whereas in FIG. 4A, clock circuitry 410 acquires the 784 kHz clock signal from oscillator 414. In either embodiment, or in embodiments not shown, it is sufficient to note that the general requirement is that clock circuitry 410 be provided with a clock signal having a frequency substantially equivalent to that of the signaling rate of the modulation circuitry, and also be provided with the receiver overhead signal 411.

It is to be noted that, with reference to FIGS. 4A and 4B, the framing circuitry 422 in the HTU-R device 406 derives its clock from PLL circuitry 424, without requiring an additional clock source to supply a separate data rate clock signal to framing circuitry 422. From this technique it may seem possible to employ a PLL circuit in the HTU-C device, by replacing clock circuitry block 410, to achieve an alternate embodiment of an HTU-C device which comprises a single clock source. However, experimental evidence has shown that such a configuration does not function properly. For example, a configuration where PLL circuitry is provided on both sides of the HDSL to replace the data clock source results in neither of the PLLs being able to properly lock onto the data frequency.

One explanation which suggests why such a configuration does not function properly is that a circular dependency is created whereby each PLL attempts to lock onto a frequency that is generated based on the other PLL locking onto a frequency on the line. However, since each PLL is expecting to lock onto a frequency which is generated by the other side, this circular dependency prevents each PLL from locking onto a proper frequency. Accordingly, research and experimental evidence suggests that it is desirable for at least one side of the SDSL or HDSL to provide an absolute clock so that the other side can lock on to it. Thus, for practical applications, a preferred model would be for the absolute clock to be provided at the HTU-C side since, typically, the device including the absolute clock will be more costly, which can better be absorbed by the central office, rather than the subscriber premises. Additionally, since the central office (CO) provides the HTU-C device, it is beneficial for the CO to have greater control over the equipment, including its timing characteristics. Thus the fact that the CO provides an absolute clock source in its HTU-C device is an added benefit. Moreover, this helps reduce the cost of the HTU-R device, since no absolute clock source for the data clock is required. Such a model fits in nicely with market analyses of SDSL and HDSL systems.

It is to be noted, however, that the opposite model may be employed, if desired. That is, it is possible for the HTU-R to contain the absolute data clock source, and the HTU-C to use a PLL device to lock onto the data clock frequency. Such a configuration is considered to be within the scope of the present invention.

It is worth noting that there may be another model for constructing an HTU-C device having a single clock source, which differs from the technique of the present invention. For example, it may be possible to construct an HTU-C device which employs a single, low frequency oscillator which is multiplied and/or divided to derive both the data rate and the signal rate. However, this model is problematic in that every oscillator includes some degree of uncertainty with respect to the frequency it generates. Normally, the uncertainty is of such a small degree that it does not affect or hinder the performance of the circuit components. However, when the oscillator frequency is multiplied, for example, the uncertainty is magnified, and becomes a factor which significantly affects the resulting oscillator frequency. This increased uncertainty, in turn, hinders the performance of the PLLs. As a result, the PLLs are not able to lock properly onto the generated oscillator frequency, and the device fails. Additionally, the use of clock multipliers and/or dividers in a circuit adds to the complexity of the circuit, which is undesirable. Thus, conventionally it has been deemed more efficient and desirable to simply provide a second clock source to the HTU-C device.

Figures 6A, 6B:
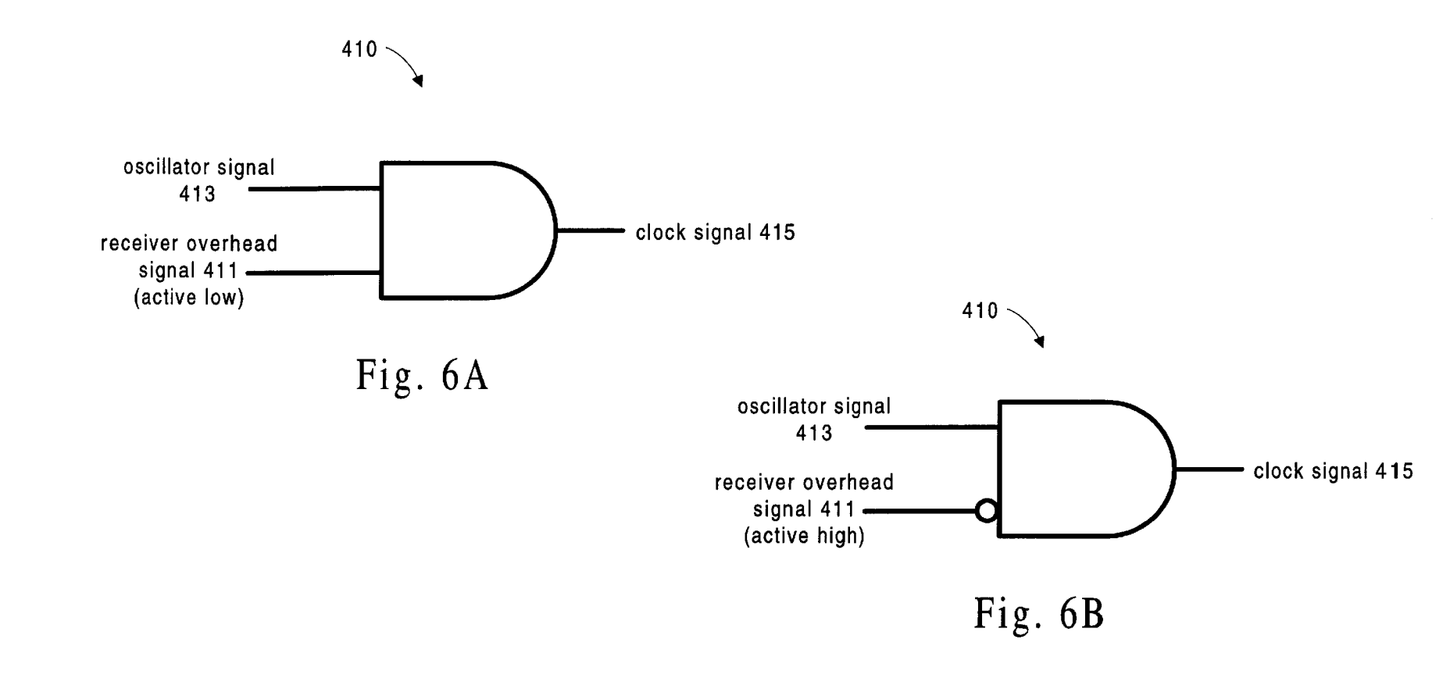

FIGS. 6A and 6B show schematic diagrams of alternate embodiments for implementing clock circuitry block 410 of FIGS. 4A and 4B. FIG. 6A corresponds tot he situation where the receiver overhead signal 411 is active low. In such a situation, the oscillator signal 413 and receiver overhead signal 411 may be combined by an AND logic gate, producing the resulting clock signal 415 as shown in FIG. 5.

FIG. 6B corresponds to a situation where the receiver overhead signal is active high. In such a situation, the binary receiver overhead signal 411 is inverted prior to entering the AND gate, and then logically ANDed with the oscillator signal 413 to produce the clock signal 415 as shown in FIG. 5.

While the invention has been particularly shown and described with reference to specific embodiments thereof, it will be understood by those skilled in the art that changes in the form and details of the disclosed embodiments may be made without departing from the spirit or scope of the invention. For example, other clock circuitry implementations than those shown in FIGS. 4A and 4B may be employed to provide one of a plurality of multiple clock signals to the framing and modulation circuitry of the invention. One such clocking technique is described in commonly assigned, co-pending U.S. patent application Ser. No. 09/107,840 for METHOD AND APPARATUS FOR TRANSMITTING DATA IN A PUBLIC NETWORK (Sharper, et. al.) filed on Jun. 30, 1998. Moreover, the principles described herein may be applied to more than HDSL and SDSL transmission and data frame standards. For example, the technique of the present invention may also be employed in asymmetric digital subscriber line (ADSL) applications, as well as satellite positioning system (SATPS) applications.

Finally, the inventions described herein may be employed in combination with other techniques to provide even greater flexibility with regard to the support of multiple data rates. One such technique is described in commonly assigned, co-pending U.S. patent application Ser. No. 09/107,230 for METHOD AND APPARATUS FOR TRANSMITTING DATA IN A PUBLIC NETWORK (Aiyagari, et. al.) filed on Jun. 30, 1998.

Although several preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A digital subscriber line (DSL) modem for receiving an incoming data stream and generating a sequence of data frames for a digital subscriber line, comprising:

a clock source for providing a first clock signal having a first clock frequency;

a modulation circuit adapted to receive said first clock signal;

a framing circuit adapted to receive said first clock signal for providing a plurality of data frames to said modulation circuit, each of the plurality of data frames including at least one payload portion and at least one frame overhead portion, the framing circuit further providing a receiver overhead signal for indicating the insertion of frame overhead bits into each data frame;

a clocking circuit adapted to receive said first clock signal and said receiver overhead signal for providing a second clock signal to said framing circuit, said clocking circuit including logic means for logically combining said first clock signal and said receiver overhead signal to generate said second clock signal, wherein said generated second clock signal has a specific timing relationship to said first clock signal and said receiver overhead signal such that while said receiver overhead signal is inactive, said second clock signal is active at a frequency substantially equal to said first clock frequency, and while said receiver overhead signal is active, said second clock signal is inactive; and wherein said framing circuit is adapted to utilize said second clock signal for communicating with said incoming data stream.

2. The DSL modem of claim 1 wherein said clock source comprises an oscillator.

3. The DSL modem of claim 1 wherein said framing circuit is adapted to utilize said second clock signal for synchronizing with said incoming data stream.

4. The DSL modem of claim 1 wherein said first clock signal is adapted for use by said modulation circuit as a signaling clock, and said second clock signal is adapted for use by said framing circuit as a data clock.

5. The apparatus of claim 1 wherein the modulation circuit includes a bit pump.

6. The DSL modem of claim 1 wherein an average frequency of said second clock signal is lower than an average frequency of said first clock signal.

7. The DSL modem of claim 6 wherein said first clock signal has an average frequency of n Hz, said receiver overhead signal has an average frequency of m Hz, and wherein said second clock signal has an average frequency of (n-m) Hz.

8. The DSL modem of claim 1 wherein said framing circuit is adapted to exclusively utilize said second clock signal for communication with said incoming data stream.

9. The DSL modem of claim 8 wherein said framing circuit does not utilize a clock signal from a second oscillator for communicating with said input data stream.

10. The DSL modem of claim 1 wherein said incoming data stream includes pulse code multiplexed (PCM) data provided for transmission over said digital subscriber line, and wherein said framing circuit includes a PCM interface circuit for communication with said PCM data, and wherein said second clock signal is provided to said PCM interface circuit for utilization in communicating with said PCM data.

11. The DSL modem of claim 10 wherein said PCM interface circuit is not adapted to utilize a clock signal from a second oscillator for communication with said PCM data.

12. The DSL modem of claim 1 wherein said DSL modem is configured as a HTU-C device.

13. The DSL modem of claim 12 wherein said second clock signal is adapted for use by said framing circuit as a data clock signal.

14. The DSL modem of claim 12, said modem being devoid of a second oscillator.

15. The DSL modem of claim 1 wherein, during production of a data frame by said framing circuit, said logic means generates second clock signal having a first frequency as measured during a first time interval and a second frequency as measured during a second time interval, and wherein said first frequency is not equal to said second frequency.

16. The DSL modem of claim 15 wherein said first frequency is zero and said second frequency is substantially equal to the frequency of said first clock signal.

17. The DSL modem of claim 1 wherein said second clock signal is comprised of a plurality of temporally non-uniform clock pulses.

18. The DSL modem of claim 1 wherein said clocking circuit is adapted to receive said first clock signal from said clock source.

19. The DSL modem of claim 1 wherein said clocking circuit is adapted to receive said first clock signal from said modulation circuit.

20. In a digital subscriber line (DSL) modem for providing a communications connection to a digital subscriber line, the DSL modem including a framing circuit for providing a plurality of data frames to a modulation circuit, each of the plurality of data frames including at least one payload portion and at least one frame overhead portion, said framing circuit further including a pulse code multiplexed (PCM) interface circuit for communication with PCM data, said PCM data being provided for transmission over said digital subscriber line, the framing circuit providing a receiver overhead signal for indicating the insertion of frame overhead bits into each data frame, the DSL modem further including a clock source configured to provide the modulation circuit with a first clock signal, an apparatus comprising:

a clocking circuit adapted to receive said first clock signal and said receiver overhead signal for providing a second clock signal to said framing circuit, said clocking circuit including logic means for logically combining said first clock signal and said receiver overhead signal to generate said second clock signal, wherein said generated second clock signal has a specific timing relationship to said first clock signal and said receiver overhead signal such that while said receiver overhead signal is inactive, said second clock signal is active at a frequency substantially equal to the frequency of said first clock signal, and while said receiver overhead signal is active, said second clock signal is inactive;

said second clock signal being provided to said framing circuit for utilization in communicating with said PCM data.

21. The apparatus of claim 20 wherein said clock source comprises an oscillator.

22. The apparatus of claim 20 wherein said DSL modem is configured as a HTU-C device.

23. The apparatus of claim 22 wherein said HTU-C device is devoid of a second oscillator.

24. The apparatus of claim 23 wherein said second clock signal functions as a data clock within said DSL modem.

25. The apparatus of claim 20 wherein an average frequency of said second clock signal is lower than an average frequency of said first clock signal.

26. The apparatus of claim 25 wherein said first clock signal has an average frequency of n Hz, said receiver overhead signal has an average frequency of m Hz, and wherein said second clock signal has an average frequency of (n-m) Hz.

27. The apparatus of claim 20 wherein said second clock signal is provided to said PCM interface circuit for utilization in communicating with said PCM data.

28. The apparatus of claim 20 wherein said second clock signal is provided to said PCM interface circuit for utilization in synchronizing with said PCM data.

29. The apparatus of claim 20 wherein said framing circuit is adapted to exclusively utilize said second clock signal for communicating with said PCM data.

30. The apparatus of claim 20 wherein, during production of a data frame by said framing circuit, said logic means generates second clock signal having a first frequency as measured during a first time interval and a second frequency as measured during a second time interval, and wherein said first frequency is not equal to said second frequency.

31. The apparatus of claims 30 wherein said first frequency is zero and said second frequency is substantially equal to the frequency of said first clock signal.

32. The apparatus of claim 20 wherein said second clock signal is comprised of a plurality of temporally non-uniform clock pulses.

33. The apparatus of claim 20 wherein said clocking circuit is adapted to receive said first clock signal from said clock source.

34. The apparatus of claim 20 wherein said clocking circuit is adapted to receive said first clock signal from said modulation circuit.

35. The apparatus of claim 20 wherein the modulation circuit includes a bit pump.

36. A digital subscriber line (DSL) apparatus for receiving an incoming data stream and generating a sequence of data frames for output to a digital subscriber line, said DSL apparatus comprising:

a clock source for providing one of a first plurality of clock signals, said one clock signal having an associated frequency of n Hz;

a framing circuit designed to receive and organize said data stream into a sequence of data frames each having a first duration, a first sequence of data frames corresponding to a first data rate, said framing circuit further providing a receiver overhead signal for indicating the insertion of frame overhead bits into each sequence of data frames, wherein said receiver overhead signal has an associated average frequency of m Hz;

a modulation circuit adapted to receive said one clock signal, for modulating the sequence of data frames and transmitting the modulated sequence of data frames at a framed data rate, wherein said framed date rate is substantially equal to the frequency of said clock signal;

a clocking circuit adapted to receive said one clock signal and said receiver overhead signal for providing a second clock signal to said framing circuit, said clocking circuit including logic means for logically combining said one clock signal and said receiver overhead signal to generate said second clock signal such that while said receiver overhead signal is inactive, said second clock signal is active at a frequency substantially equal to said one clock frequency, and while said receiver overhead signal is active, said second clock signal is inactive, thereby producing the second clock signal having an associated average frequency of (n-m) Hz; and wherein said framing circuit is adapted to utilize said second clock signal for generating said sequence of data frames, each of said sequence of data frames having an associated average frequency of (n-m) Hz.

37. The apparatus of claim 36 wherein said apparatus is configured as a HTU-C device.

38. The apparatus of claim 37 wherein said clock source comprises an oscillator.

39. The apparatus of claim 38 wherein said apparatus comprises exactly one oscillator.

40. The apparatus of claim 37 wherein said framing circuit receives no clock signal from a second oscillator.

41. The apparatus of claim 37 wherein said framing circuit receives no clock signal other than said one clock signal and said second clock signal.

42. The apparatus of claim 37 wherein said framed data rate and said first data rate are derived from said one clock signal.

43. The apparatus of claim 37 wherein said second clock signal is adapted for use by said apparatus as a data clock.

44. The apparatus of claim 37 wherein said apparatus is devoid of a second oscillator.

45. The apparatus of claim 36 wherein the modulation circuit includes a bit pump.

46. The apparatus of claim 36 wherein the modulation circuit modulates the sequence of data frames according to a 2B1Q encoding scheme.

47. The apparatus of claim 36 wherein the framing circuit is designed to generate the sequence of data frames according to a high data rate digital subscriber line (HDSL) standard format.

48. The apparatus of claim 36 wherein said second clock signal is comprised of a plurality of temporally non-uniform clock pulses.

49. The apparatus of claim 36 wherein said clocking circuit is adapted to receive said one clock signal from said clock source.

50. The apparatus of claim 36 wherein said clocking circuit is adapted to receive said one clock signal from said bit pump.

51. In a digital subscriber line (DSL) modem for providing a communications connection to a digital subscriber line, the DSL modem configured as a HTU-C device, the DSL modem including a framing circuit for providing a plurality of data frames to a modulation circuit, the framing circuit further providing a receiver overhead signal for indicating the insertion of frame overhead bits into each data frame, the DSL modem further including a clock source configured to provide the modulation circuit with a first clock signal, a method for generating a second clock signal to be used by said framing circuit in generating the plurality of data frames, the method including:

(a) receiving said first clock signal;

(b) receiving said receiver overhead signal;

(c) combining said first clock signal with said receiver overhead signal to generate said second clock signal such that, while said receiver overhead signal is inactive, said second clock signal is active at a frequency substantially equal to said first clock frequency, and while said receiver overhead signal is active, said second clock signal is inactive; and (d) providing said second clock signal to the framing circuit.

52. The method of claim 51 further including the step of not providing to said framing circuit a clock signal from a second oscillator.

53. The method of claim 51 further including the step of using said second clock signal as a data clock.

54. The method of claim 51 wherein said first clock signal has an average frequency of n Hz, said receiver overhead signal has an average frequency of m Hz, and wherein said second clock signal has an average frequency of (n-m) Hz.

55. The method of claim 51 wherein said second clock signal is comprised of a plurality of temporally non-uniform clock pulses.

56. The method of claim 51 further including the step of using the second clock signal for generation of the plurality of data frames by the framing circuit.

57. The method of claim 51 wherein said framing circuit includes a PCM interface circuit for communication with pulse code multiplexed (PCM) data, and wherein the method further includes the step of providing said second clock signal to said PCM interface circuit for utilization in communicating with said PCM data.

58. The method of claim 57 further including the step of using the second clock signal to synchronize with said PCM data.

59. In a digital subscriber line (DSL) modem for providing a communications connection to a digital subscriber line, the DSL modem configured as a HTU-C device, the DSL modem including a framing circuit for providing a plurality of data frames to a modulation circuit, the framing circuit further providing a receiver overhead signal for indicating the insertion of frame overhead bits into each data frame, the DSL modem further including a single clock source configured to provide the modulation circuit with a first clock signal having an associated first clock frequency, a method for providing the framing circuit with a data clock signal for use in generating the plurality of data frames, the data clock signal being derived from said single clock source, the method including:

(a) receiving said first clock signal;

(b) receiving said receiver overhead signal;

(c) while said receiver overhead signal is inactive, providing an active data clock signal to said framing circuit, wherein said data clock signal has an associated frequency substantially equal to the frequency of said first clock signal; and (d) while said receiver overhead signal is active, providing an inactive data clock signal to said framing circuit.

60. The method of claim 59 further including the step of not providing to said framing circuit a clock signal from a second oscillator.

61. The method of claim 59 wherein said first clock signal has an average frequency of n Hz, said receiver overhead signal has an average frequency of m Hz, and wherein said data clock signal has an average frequency of (n-m) Hz.

62. The method of claim 59 wherein said data clock signal is comprised of a plurality of temporally non-uniform clock pulses.

63. The method of claim 59 further including the step of using the data clock signal for generation of the plurality of data frames by the framing circuit.

64. The method of claim 59 wherein said framing circuit includes a PCM interface circuit for communication with pulse code multiplexed (PCM) data, and wherein the method further includes the step of providing said data clock signal to said PCM interface circuit for utilization in communicating with said PCM data.

65. The method of claim 64 further including the step of using the data clock signal to synchronize with said PCM data.

66. In a digital subscriber line (DSL) modem for providing a communications connection to a digital subscriber line, the DSL modem configured as a HTU-C device, the DSL modem including a framing circuit for generating a plurality of data frames to a modulation circuit, the framing circuit further providing a receiver overhead signal for indicating the insertion of frame overhead bits into each data frame, the DSL modem further including a single clock source configured to provide the modulation circuit with a first clock signal having an associated first clock frequency, a method for generating the plurality of data frames using said single clock source, the method including:

(a) receiving said first clock signal;

(b) receiving said receiver overhead signal; and (c) using said received first clock signal and said received receiver overhead signal to clock data into one of said plurality of data frames at a data rate substantially equal to said first clock frequency only during time intervals when frame overhead bits are not being inserted into said one data frame.

67. The method of claim 66 further including the step of combining said first clock signal with said receiver overhead signal to generate a second clock signal such that, while said receiver overhead signal is inactive, said second clock signal is active at a frequency substantially equal to said first clock frequency, and while said receiver overhead signal is active, said second clock signal is inactive.

68. The method of claim 67 further including the step of using said second clock signal as a data clock.

69. The method of claim 67 wherein said first clock signal has an average frequency of n Hz, said receiver overhead signal has an average frequency of m Hz, and wherein said second clock signal has an average frequency of (n-m) Hz.

70. The method of claim 67 wherein said second clock signal is comprised of a plurality of temporally non-uniform clock pulses.

71. The method of claim 67 wherein said framing circuit includes a PCM interface circuit for communication with pulse code multiplexed (PCM) data, and wherein the method further includes the step of providing said second clock signal to said PCM interface circuit for utilization in communicating with said PCM data.

72. The method of claim 71 further including the step of using the second clock signal to synchronize with said PCM data.

* * * * *

UNITED STATES PATENT AND TRADEMARK OFFICE
CERTIFICATE OF CORRECTION

PATENT NO. : 6,195,385 B1
DATED : February 27, 2001
INVENTOR(S) : Aiyagari et al.

It is certified that error appears in the above-identified patent and that said Letters Patent is hereby corrected as shown below:

<u>Title page,</u>
Item [73], Assignee, please change "Cisco Systems, Inc." to -- Cisco Technology, Inc. --

Signed and Sealed this

Twelfth Day of March, 2002

*Attest:*

*Attesting Officer*

JAMES E. ROGAN
*Director of the United States Patent and Trademark Office*